Nov. 19, 1940.  C. W. MOTT  2,222,115
LIFTING MECHANISM FOR TRACTORS
Filed Oct. 8, 1938  3 Sheets-Sheet 3
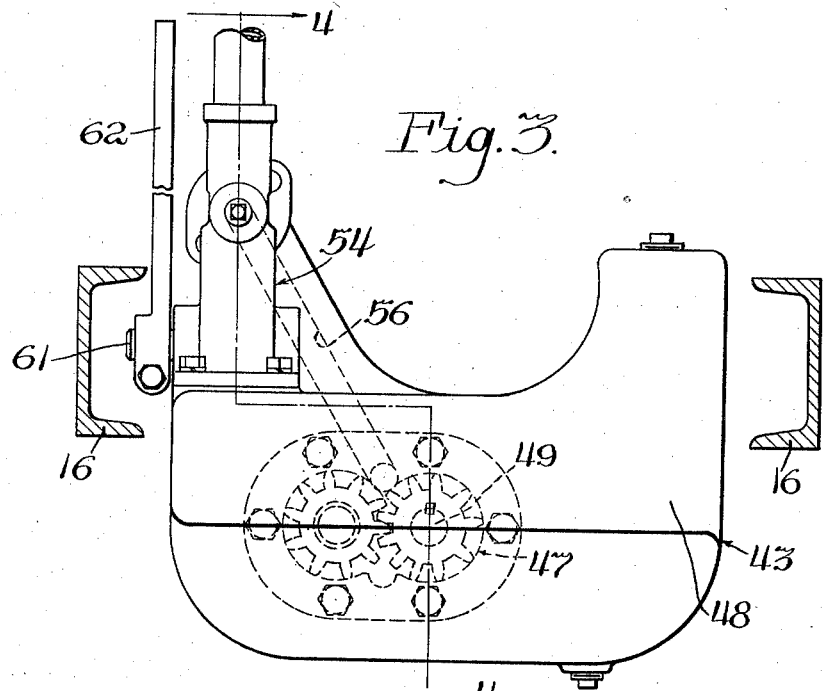
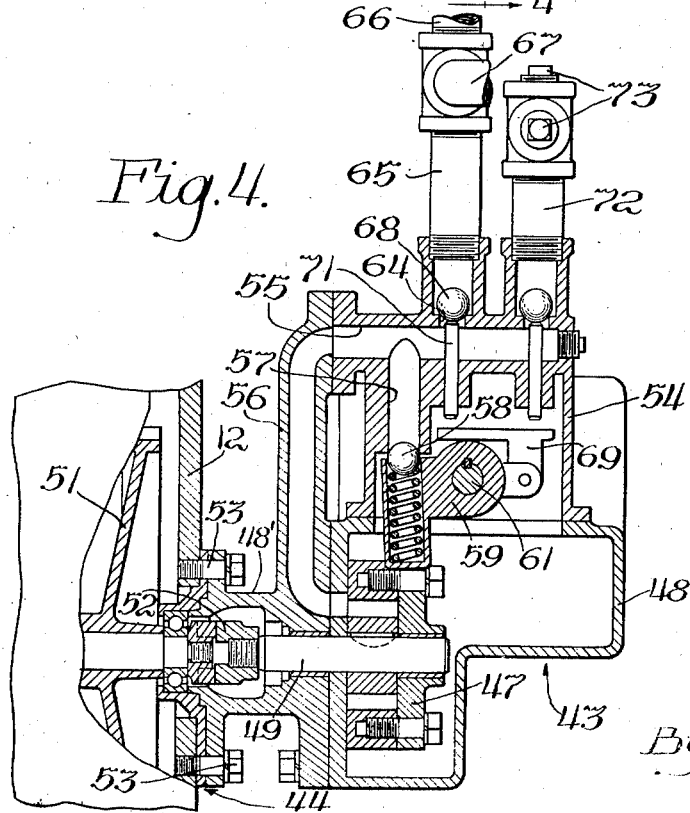
Inventor
Carl W. Mott
By V. F. Lassagne
Att'y.

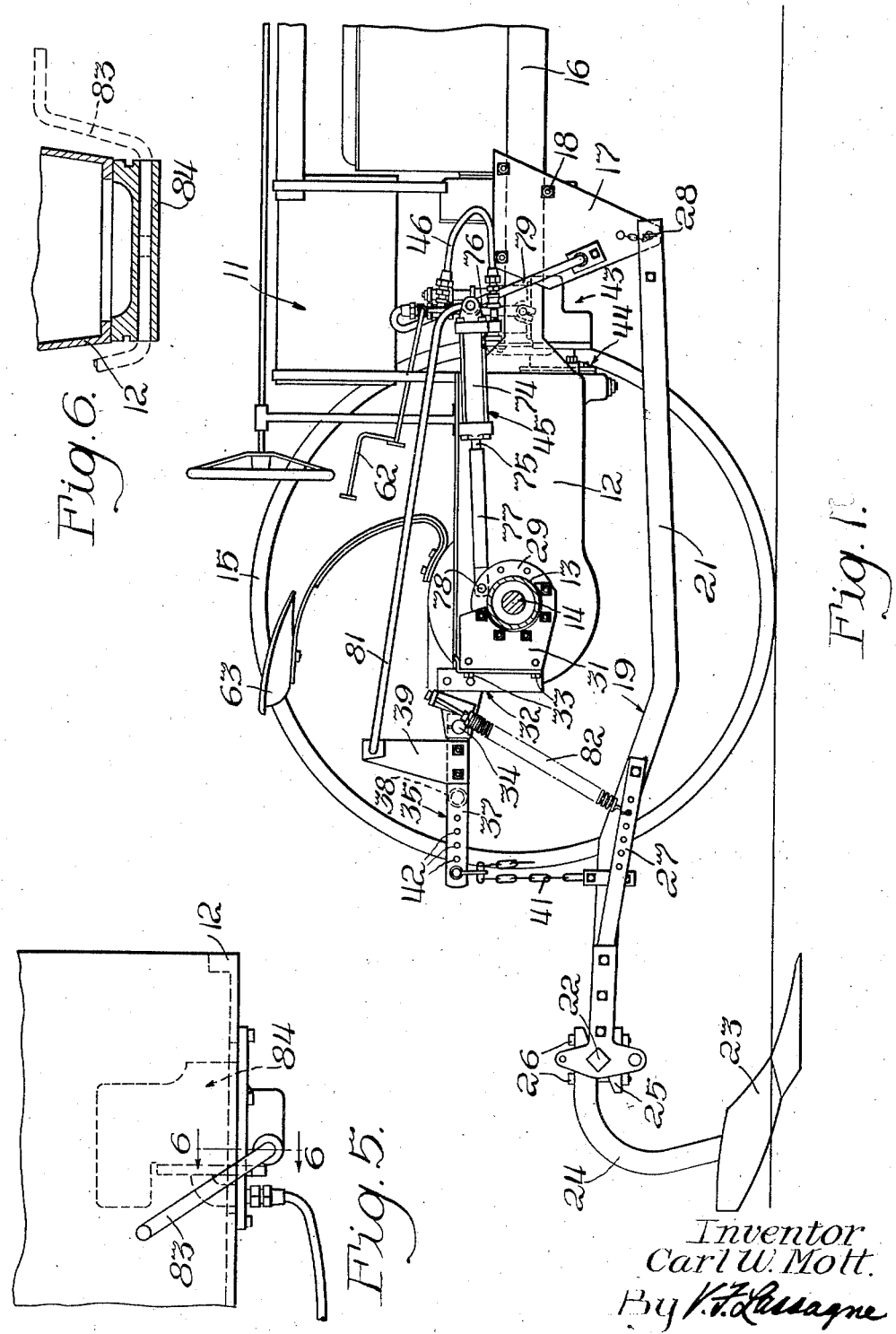

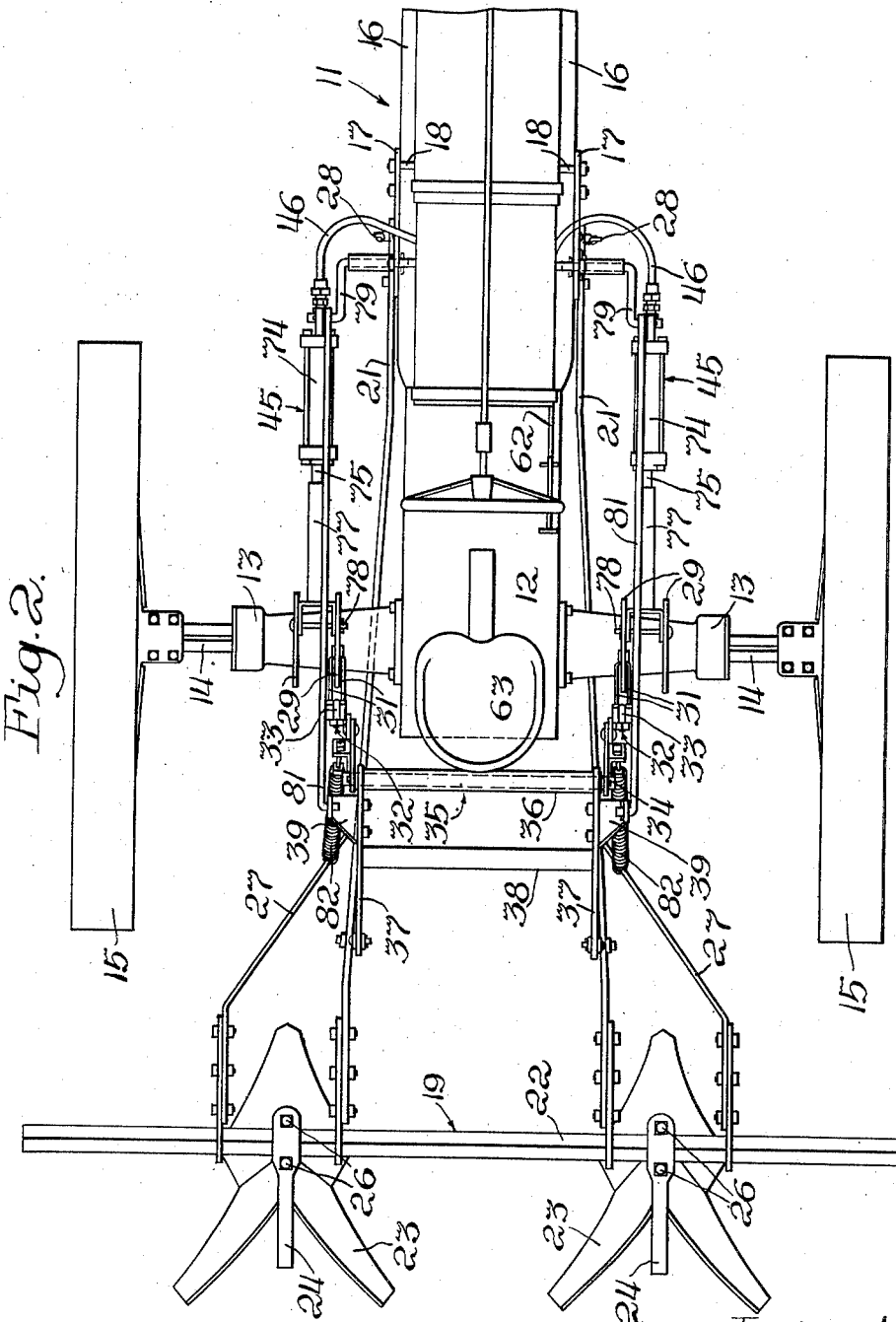

Patented Nov. 19, 1940

2,222,115

UNITED STATES PATENT OFFICE 2,222,115

LIFTING MECHANISM FOR TRACTORS

Carl W. Mott, Rock Falls, Ill., assignor to International Harvester Company, a corporation of New Jersey Application October 8, 1938, Serial No. 233,996

10 Claims. (Cl. 97—50)

This invention relates to a power lifting mechanism for raising and lowering ground working implements which are directly connected to tractors. More particularly the invention relates to a hydraulic arrangement comprising a pump and valve unit and separable, extensible power applying units.

It is an object of the invention to provide a novel means for mounting of the separate power units on the tractor.

It is another object of the invention to provide a means for mounting the power unit wherein the particular units will be supported by means on the separately mounted pump and valve unit.

It is another object of the invention to provide a plurality of power units so that power is applied to a rockable lifting means for raising a transversely extending implement at a plurality of locations spaced transversely of the rockable means, so that the power acting on the implement is positively distributed transversely thereof, the connections between the rockable means and the implement being alined therewith.

In general, the invention comprises a pump and valve unit adapted to be connected to the bottom portion of the transmission and differential gear housing to be driven by the gearing thereof, and a pair of separable, extensible power cylinder units, operated by fluid from the pump and valve unit, which are mounted one at each side of the tractor and connected to act upon a transversely extending rockable means mounted on the rear of the tractor, which, in turn, is rocked to raise and lower a transversely extending implement directly connected to the tractor for vertical adjustment with respect thereto. By having power applied to the rockable means at transversely spaced locations, the same will be imparted to the implement at transversely spaced locations, whereupon one side of the implement will have the same power positively applied thereto as will the other side, thereby eliminating any twisting of the rockable means, which is present if power is applied to the rockable means only at one location thereon.

The individual power units comprise two relatively movable parts, one of which is anchored on the tractor and the other of which is supported on a pivotal support for permitting movement of the movable part relative to the anchored part. This pivotal support for supporting a part of the power unit is carried by a supporting structure adapted to be detachably connected to the tractor, such as by depending plates or by the pump and valve unit connected to the bottom portion of the gear housing of the tractor.

For a better understanding of the invention, reference may be had to the following detail description taken in connection with the accompanying drawings, in which:

Figure 1 is a side elevational view of a portion of a tractor with its right wheel removed, showing the implement and the power lifting mechanism of the present invention attached to the tractor;

Figure 2 is a plan view of the tractor illustrating particularly the arrangement of the power units relative to the transversely extending implement;

Figure 3 is an elevational view of the pump and valve unit of the form shown in Figures 1 and 2;

Figure 4 is also an elevational view of a pump and valve unit shown in Figure 3 taken in longitudinal section along the line 4—4 of Figure 3 and showing its connection to the gear housing of the tractor;

Figure 5 is another form of a pump and valve unit showing the supporting means for the power unit associated therewith; and, Figure 6 is a sectional view taken on the line 6—6 of Figure 5 and illustrating the supporting means for the units at each side of the tractor.

Referring to Figures 1 and 2, there is shown a tractor indicated generally at 11, having a transmission and differential gear housing 12 from which there extends laterally extending rear axle housings 13 enclosing laterally extending rear axles 14, to which are connected the rear traction wheels 15 of the tractor. The tractor also has side sills 16 to which are detachably connected downwardly extending plates 17 held thereon by means of hook bolts 18, said plates forming supporting structure adapted to be detachably connected to the tractor. Pivotally connected to these plates are the forward ends of a transversely extending implement 19. This implement comprises, in general, longitudinally, forwardly extending draft beams 21 having connected at their rear ends a transversely extending tool bar 22, on which working tools 23 may be mounted at any location thereon, the tool being carried by a stub beam 24 and made rigid with the tool bar 22 by means of a clamping plate 25 and clamping bolts 26. To give rigidity to the implement, there is provided a brace 27 connected to the transversely extending tool bar 22 and forwardly to the longitudinally extending beams 21. The longitudinally extending beams 21 have their forward ends connected with the plates 17 and adapted for ready attachment thereto by means of a pivot pin connecting element 28. It should now be seen that the implement is so connected to the tractor that it may have vertical adjustment relative thereto.

The rear axle housing 13 has radially extending plates 29, to which may be attached vertically extending, quick detachable plates 31 for the ready attachment thereto of a bracket 32 by means of usual swing bolts 33, in a manner well known in the art. This bracket carries a transversely extending shaft 34 on which is mounted rockable lifting means or member, generally indicated at 35. This rockable means comprises a transversely extending sleeve 36 having welded thereto rearwardly extending lifting arms 37, between which is connected a bracing pipe 38, and to which are connected plates 39 extending at right angles thereto. The lifting arms 37 are connected with the implement by means of chain links 41 depending from the outer ends of the lifting arms 37, but adapted to be adjustable in its connection to the lifting arm longitudinally of the tractor by means of openings 42. The rockable member can be removed from the bracket 32 by removal of the shaft 34 or it can be moved with the bracket 32 upon removing the same from the tractor.

The hydraulic arrangement of the present invention comprises, in general, a pump and valve unit 43 connected to the transmission and differential housing 12, at 44, and a pair of extensible power cylinder units 45, one at each side of the tractor, adapted to receive fluid from the pump and valve unit by means of flexible conduits 46. Referring to Figures 3 and 4, there is shown in detail the pump and valve unit 43 and, in Figure 4, there is particularly shown its connection with the transmission and differential housing 12. The unit 43 contains a gear pump 47 located within a fluid-containing housing 48 to receive fluid therefrom and driven by means of a shaft 49 adapted for quick attachment to gearing 51 within the housing 12. This means, also connecting the shaft 49 to the gearing, comprises interlocked, clutched elements 52 enclosed by a projecting portion 48' of the housing 48, which is rigidly connected to the housing 12 by means of bolts 53. Mounted on the housing 48 is a valve housing 54 having a laterally extending conduit 55 adapted to receive fluid under pressure from a conduit means 56 having communication with the outlet side of the pump 47. When the implement is in its ground-working position, the fluid entering the conduit 55 is by-passed through a conduit 57 and by the valve 58, and it returns through the bottom opening of the housing 54 to the fluid-containing housing 48. This valve 58 may be actuated by an arm 59 rigid with a control shaft 61 adapted to be actuated by the manual control means 62 accessible to the operator's station 63 on the tractor. Upon rotating the shaft 61 and the arm 59 containing the valve 58, the conduit 57 will be closed and fluid now entering the conduit 55 will be diverted through a valve-controlled opening 64 to a conduit 65, to which the flexible conduits 46 are attached, one at 66 and the other at 67. This fluid, upon reaching the power units 45, will serve to extend the same. The amount of fluid delivered to the power units may be controlled by the manual means 62 and the power unit may thus be actuated to any fractional part of its stroke, thereby effecting regulation of the working depth of the implement.

The opening 64 is controlled by a ball valve 68 and the fluid delivered to the units may be trapped or retained by means of this valve 68. When it is desired to relieve the power unit of fluid, there is provided a means 69 carried by the shaft 61 and actuable upon rotation of the shaft 61 in a direction opposite to that at the time of closing the valve 68 to act upon a pin 71 to unseat the valve 68, thereby permitting return of the fluid through the opening 57 to the fluid-containing housing 48. Associated with the housing 54, there is shown a second conduit means 72, which is shown closed by plugs 73, since the same is not being used in the present arrangement of the power units.

The individual power units comprise in general two relatively movable parts 74 and 75. The part 74 is in the form of a cylinder and the part 75 is in the form of a piston and piston rod. The cylinder 74 has a coupling means 76 at its forward end for the attachment of the conduit 46 for receiving the working fluid to extend the cylinder relative to the piston. When the fluid leaves the cylinder, it does so through the same conduit 46; hence the present power unit may be readily identified as one of the single-acting type.

According to the present invention, there has been provided a novel means of mounting this cylinder unit on a tractor so that it is separable from the ground-working implement 19 and from the lifting mechanism 35. Means is provided for anchoring the part 75 to the rear axle housing 13. This means comprises the attaching of a sleeve 77, in which the piston rod is located, to the plate 29 of the rear axle housing 13, as indicated at 78.

With the part 75 anchored, a movement of the movable part or cylinder 74 will take place, and it is necessary that the same be supported and, at the same time, that movement be permitted of the same. Hence, there has been provided a pivotal support or means 79 extending upwardly from its point of connection to the downwardly depending plates 17 carried by the side sills 16 of the tractor. This pivotal support 79 permits fore and aft movement of the cylinder 74 of the unit. It should now be seen from the foregoing that, by closing of the valve 58, the cylinder 74 will move forwardly on the pivotal support 79. The power units 45 are connected by means of links 81 extending rearwardly from the forward part of the cylinder 74 at the point of connection of the pivotal support 79 thereto and connected at their rearward ends to the plates 39 carried by the lifting arms 37 of the rockable member 35, whereupon movement of the cylinder 74 will be imparted through the rockable member and through the connection 41 to the implement to vertically adjust the same. In order to assist the power units in the lifting of the implement 19 out of the ground, there are provided helping springs 82 connected to the braces 27 of the implement and to the bracket 32 on the tractor.

Referring to Figure 2, there is shown the power units located one at each side of the tractor adapted to be operated in unison and connected to the transversely extending implement 19 through the rockable lifting member 35 at transversely spaced locations relative thereto. Hence, the power applied to the rockable lifting member 35 by the power units 45 is applied at locations in alinement with each point of connection of the same to the implement. By so applying the power units, the power for lifting the implement is positively distributed to two locations and the implement will be more readily lifted without placing undue strains on the rockable member 35. Heretofore, power has been applied to the lifting means at a single location thereon, and hence any tendency for the implement to drag on one side of the same, upon being lifted, more than on the other side of the same would place a great strain on the lifting mechanism. It is thus to be noted that, by the present invention of so arranging the units in their connection to the lifting member, these strains on the lifting means will be eliminated.

Referring now to Figures 5 and 6, there is shown another form of the invention wherein a pivotal support 83 is carried by the pump and valve unit 84, which is adapted to be connected to the gear housing 12 and removable with the pump and valve unit upon being detached from the housing 12. By having this pivotal support adapted to be carried by the pump and valve unit, the necessity for having a separate supporting structure, such as the plates 17, for mounting of the pivotal support is eliminated thus making the hydraulic arrangement much more composite. Also, the need for two plates 17, one on each side, is eliminated, since, as shown in Figure 6, the two pivotal supports are both carried by the pump and valve unit 84, this pump and valve unit being mounted on the bottom side of the housing 12 and hence being accessible from each side of the tractor. It should now be seen that the entire hydraulic arrangement is separable from the implement as well as from the rockable member 35; also, that it may be left on the tractor to provide power for acting upon other forms of implements which may be attached to the tractor.

While, as shown in Figures 5 and 6, the pump and valve unit is being used as a supporting structure for mounting of the pivotal support 83, it shall be understood that the pump and valve unit in its broad sense serves as any means for the connecting and supporting of the power units.

While various modifications and changes might suggest themselves as to the detail construction herein shown, it shall be understood that such changes shall be made without departing from the spirit and scope of the appended claims.

What is claimed is:

1. In combination, a tractor having a gear housing, an implement mounted on the tractor for vertical adjustment, a hydraulic lifting arrangement comprising a pump and valve unit adapted for attachment to the gear housing to be driven by the gear thereof and a separable extensible power unit connected to the implement to adjust the same, said pump and valve unit having means for supporting the extensible power unit.

2. In combination, a tractor having a gear housing, an implement mounted for adjustment on the tractor, a hydraulic lifting arrangement comprising a pump and control valve unit adapted for attachment to the gear housing to be driven by the gearing thereof, and an extensible power unit connected to the implement to adjust the same and having two relatively movable parts, means for anchoring one of the parts to the tractor, and a pivotal member carried by the pump and valve unit to be removable therewith for supporting the other of said parts to permit movement thereof upon the unit being extended to adjust the implement.

3. In combination, a tractor having a transmission and differential gear housing, an implement mounted on the tractor for vertical adjustment, a hydraulic lifting arrangement comprising a pump and valve unit adapted for attachment to the bottom of the gear housing to be driven by the gear thereof, and a pair of extensible power units for adjusting the implement, each of which has two relatively movable parts, means for anchoring one of the parts of each unit to the tractor, and a pair of pivotal members carried by the pump and valve unit, one at each side thereof for supporting the other of said parts of the units respectively to permit movement thereof upon the units being operated to adjust the implement.

4. In combination, a tractor having a transmission and differential gear housing and a transversely extending rear axle housing, an implement mounted on the rear of the tractor for vertical adjustment, a hydraulic lifting arrangement comprising a pump and control valve unit adapted for attachment to the transmission and differential housing to be driven by the gear thereof, and an extensible power unit connected to the implement to adjust the same and having two relatively movable parts, means for detachably anchoring one of the parts to the rear axle housing, and a pivotal member carried by the pump and valve unit to be removable therewith for supporting the other of said parts to permit movement thereof upon the unit being extended to adjust the implement.

5. In combination, a tractor, a transversely extending implement mounted for vertical adjustment on the tractor, a transversely extending rockable lifting means mounted on the tractor and having a lifting arm at a location at each side of the center line of the tractor connected to the implement at the respective sides thereof, and a plurality of power units each connected to act upon the rockable means at each location near to the lifting arms thereof, whereby one side of the implement will have the same power positively applied thereto as will the other side.

6. In combination, a tractor, a transversely extending implement mounted for vertical adjustment on the tractor, a transversely extending rockable lifting means mounted on the tractor and connected to the implement to adjust the same at a plurality of spaced locations thereon, a power unit mounted at each side of the tractor and connected to the rockable means at spaced transverse locations thereon to act upon the same to adjust the implement by joint operation of the units, whereby one transverse location of the implement will have the same power positively applied thereto as will another transverse location.

7. In combination, a tractor having a rear axle housing, a transversely extending implement mounted for vertical adjustment at the rear of the tractor, a hydraulic lifting arrangement including a pair of extensible power units, means for anchoring the units to the rear axle, one at each side of the tractor, said units extending forwardly of the rear axle housing and including a movable part, means for supporting the movable part on the tractor for movement with respect thereto, and means for connecting the movable parts respectively to the implement at transversely spaced locations thereon, whereby upon joint operation of the units the power acting upon the implement is distributed transversely thereto.

8. In combination, a tractor having a gear housing and a rear axle housing, a transversely extending implement mounted for vertical adjustment on the rear of the tractor, a transversely extending rockable lifting means mounted on the tractor and having lifting arms at a location at each side of the center line of the tractor connected to the implement, a hydraulic arrangement including a pump and valve unit connected to the bottom of the gear housing to be driven by the gear thereof, and a pair of extensible power units for adjusting the implement, each of which has two relatively movable parts, means at each side of the tractor on the rear axle housing for anchoring the one part of the unit respectively, a pair of pivotal members carried by the pump and valve unit, one at each side thereof for supporting said movable parts of the units respectively to permit movement thereof upon the units being operated to adjust the implement, means associated with the movable part of each unit for connecting the unit to the rockable means to act upon the same at each location respectively near to the lifting arms thereof, whereby power for acting on the implement to adjust the same is distributed transversely thereto.

9. In combination, a tractor, a transversely extending implement connected to the tractor for vertical adjustment, a transversely extending rockable lifting means mounted on the tractor and having lifting arms at a location at each side of the center line of the tractor and connected to the implement at transversely spaced locations thereon, a hydraulic lifting arrangement including a pair of extensible power units, means for anchoring the units to the tractor, one at each side thereof and each of said units including a movable part, means for supporting the movable part on the tractor for free movement with respect thereto, and means associated with the movable part of each unit for connecting the unit to the rockable lifting means to act upon the same at each location respectively near to the lifting arms thereof, whereby one side of the implement will be assured of having power positively applied as will the other side thereof.

10. In combination, a tractor having a body portion and a gear housing, a transversely extending implement connected to the body portion for vertical adjustment, a transversely extending rockable lifting means mounted on the tractor and having lifting arms at a location at each side of the center line of the tractor and connected to the implement at transversely spaced locations thereon, a hydraulic arrangement including a pump and valve unit connected to the gear housing to be driven by the gear thereof, a pair of extensible power units for adjusting the implement, each of which has two relatively movable parts, means at each side of the tractor for anchoring the one part of the unit respectively, a pair of pivotal supports carried by the pump and valve unit, one at each side thereof for supporting said movable parts of the units respectively to permit free movement thereof upon the units being operated to adjust the implement, and means associated with the movable part of each unit for connecting the unit to the rockable means to act upon the same at each location respectively near to the lifting arms thereof, whereby power for acting on the implement to adjust the same is distributed transversely thereto.

CARL W. MOTT.